United States Patent [19]

Naiman et al.

[11] Patent Number: 4,836,672
[45] Date of Patent: Jun. 6, 1989

[54] COVERT OPTICAL SYSTEM FOR PROBING AND INHIBITING REMOTE TARGETS

[75] Inventors: Charles S. Naiman, Brookline, Mass.; Marvin King, New York; Michael Greenbaum, Brooklyn, both of N.Y.

[73] Assignee: Riverside Research Institute, New York, N.Y.

[21] Appl. No.: 148,750

[22] Filed: May 2, 1980

[51] Int. Cl.⁴ .......................... G01C 3/08; F41F 5/00; G01J 1/20; H04B 9/00
[52] U.S. Cl. .......................................... 356/5; 89/1.11; 126/425; 250/203 R; 350/622; 353/3; 455/614
[58] Field of Search ................ 350/289, 622; 455/614, 455/600, 601, 604, 605, 606, 608, 616, 617; 250/203 R; 353/3; 89/1 A, 1.11; 356/5; 126/425; 362/259, 20

[56] References Cited

U.S. PATENT DOCUMENTS

| | | | |
|---|---|---|---|
| 235,199 | 12/1880 | Bell | 455/614 |
| 2,022,144 | 11/1935 | Nicolson | 353/3 |
| 2,234,329 | 3/1941 | Wolff | 455/605 |
| 3,065,352 | 11/1962 | McFarlane | 455/614 |
| 3,166,672 | 1/1965 | Gardner | 455/600 |
| 3,427,611 | 2/1969 | Enenstein | 455/604 |
| 3,562,533 | 2/1971 | Doyle et al. | 455/616 |
| 3,610,755 | 10/1971 | Nieberger et al. | 356/4 |
| 3,946,233 | 3/1976 | Erben et al. | 89/1 A |
| 4,139,286 | 2/1979 | Hein et al. | 353/3 |
| 4,209,253 | 6/1980 | Hughes | 250/203 R |
| 4,227,776 | 10/1980 | Morton et al. | 362/259 |

OTHER PUBLICATIONS

Krasnov, Light-Detector and Weapon, pp. 71-85, Translation Under contract #AF33(657)-16408, Nov. 1967.

Primary Examiner—Stephen C. Buczinski
Attorney, Agent, or Firm—Brumbaugh, Graves, Donohue & Raymond

[57] ABSTRACT

An optical system makes use of solar illumination as a light source to achieve covert operation.

8 Claims, 11 Drawing Sheets

COVERT OPTICAL SYSTEM FOR PROBING AND INHIBITING REMOTE TARGETS

BACKGROUND OF THE INVENTION

This invention relates to electronic surveillance systems, and particularly to surveillance systems designed and adapted to probe optical systems in a remote vehicle, such as a weapon or an Earth-orbiting artificial satellite.

In the prior art there have been known systems, generally designated "optical augmentation systems" for transmitting a light beam, preferably a laser beam, with concentrated intensity in the direction of a suspected non-friendly optical system, such as a laser rangefinder on an artillery weapon, a surveillance camera, or a periscope. The basic characteristic of typical focal plane optics, including cameras, TV vidicons, telescopes, photomultiplier tubes, and rangefinders, is that radiation incident on the detecting instrument, which originates within the field-of-view of the detecting instrument, tends to be retro-reflected in a concentrated beam in the direction from which it was incident. Thus, a laser beam directed at a non-friendly satellite with camera surveillance equipment is focused onto the image plane of the camera equipment, reflected off the smooth surface of the image plane, refocused into a concentrated retro-reflected beam by the lens of the camera equipment and retransmitted from the camera in the direction from which it was incident.

By making use of this retro-reflection characteristic of optical systems, including non-friendly optical systems, it becomes possible to detect and track such optical systems and to determine certain characteristics of the optical equipment, and thereby obtain information regarding the type of equipment which is included in a non-friendly vehicle, such as a satellite, a ship, or an armored vehicle.

One difficulty with prior art optical augmentation systems using laser illumination is that an enemy vehicle may sense the fact that it is being illuminated by laser light. Laser light is easily sensed because it has discrete frequency ranges, which are determined by the type of laser being used. By detecting the emission of laser light from an installation, an enemy vehicle can sense that it is being illuminated by a laser. This determination can be provocative to the owner or operator of the vehicle and the incident laser beam can be used for determining the location of a military installation or friendly equipment.

It is therefore an object of the present invention to provide an optical augmentation system which is capable of probing a non-friendly vehicle or equipment without alerting the owner of the vehicle or equipment to the fact that such probing is taking place.

Is is a further object of the present invention to provide a non-provocative illumination source for photography It is a still further object of the present invention to provide non-provocative means for inhibiting operation of non-friendly optical equipment.

SUMMARY OF THE INVENTION

In accordance with the present invention there is provided an improvement in an apparatus for illuminating an optical system with energy retro-reflected from the optical system. In accordance with the invention the illuminating means comprises means for directing solar illumination, and the sensing mean is responsive to solar illumination retro-reflected from the optical system.

In accordance with the invention there is provided a method for determining the optical characteristics of a system comprising the steps of transmitting solar energy at the system, detecting solar energy retro-reflected from the system, and analyzing the optical characteristics of the retro-reflected energy thereby to determine the optical characteristic of the system.

In accordance with the present invention there is provided an improvement in a method for photographing an object wherein a concentrated beam of light is directed at the object to briefly illuminate the object. In accordance with the invention the method is improved by using a concentrated beam of sunlight to illuminate the object, briefly.

In accordance with the invention there is provided a light beam transmitting apparatus, which is usable in a system for optically probing a target. The light beam transmitting apparatus comprises a steerable light collecting means for collecting direct solar illumination. There is also provided a steerable light means for sending a light beam in a selected direction. A light modulating means is provided for selectively coupling the collecting means and the sending means.

In accordance with further refinements of the invention the collecting means comprises reflectors which are mounted for rotation to steer light around first and second axes whereby sunlight may be collected and directed along a fixed optical path. The apparatus could further include reflectors which are mounted for rotation to steer light around third and fourth axes whereby sunlight may be directed from the fixed optical path into any selected direction. Alternatively, the collecting means or the sending means or both can include flexible light guides, such as fiber optical light guides.

Preferably, the apparatus of the collecting means includes solar tracking means for steering the collecting means to follow movements of the sun. The tracking means can include means, responsive to the direction of incidence of the solar illumination, thereby to follow movement of the sun across the sky. In one embodiment the modulating means can include pseudo-random noise amplitude modulation whereby the coupled light is sent into the selected direction with an amplitude modulation which resembles scattered sunlight. In another embodiment a laser can be used to generate a coherent laser beam which can be combined with the solar illumination and supplied to the light sending means.

In accordance with another aspect of the invention there is provided a system for sensing optical characteristics of a target which includes at least one optical sensor oriented to receive optical illumination from directions which include the location of the sensing system. The sensing system includes target illuminating means for directing a transmission of solar radiation along a selected optical path in the direction of the target and retroreflection receiving means, substantially colocated with the illumination means, for detecting solar radiation reflected from the optical sensor.

In a preferred embodiment there is provided means for measuring selected properties of the reflected solar radiation, thereby to determine characteristics of the optical sensor.

The properties measured can include modulation, to determine shutter characteristics of the sensor, spectrum of the detected light, for determining spectral characteristics of the sensor, transit time, for determining range of the sensor, reflected beamwidth, for determining resolution of the sensor, and polarization, for determining polarization characteristics of the sensor. Target tracking means may be provided for pointing the illuminating means and the receiving means at the target as the target moves with respect to the system. The system may be satellite mounted, and in this case, it is possible to use a solar collector panel as the illumination means in combination with a means for orienting the panel to reflect solar radiation along the selected optical path. The solar collector panel may comprise an array of shingle-like collectors In one case at least one of the shingle-like collectors can have selected spectral reflection characteristics, thereby to give the transmitted light a desired spectral content. The system may also include pseudo-random amplitude modulating means, so that the transmitted signal has a pseudo-random modulation, in which case it is desirable for the receiving means to include a matched filter for synchronous detection of the modulation signal.

In accordance with another aspect of the invention there is provided a weapon for inhibiting operation of or jamming an optical sensor oriented to receive optical illumination from directions which include the location of the weapon. The weapon includes means for collecting solar light energy, and a controllable, steerable illuminator for transmitting the solar light energy along the optical path. There is also provided target location and tracking means for orienting the optical path in the direction of the sensor, and illumination control means for causing the illuminator to direct the solar light energy along the path toward the sensor with an intensity and duration sufficient to inhibit operation of the sensor.

The weapon of the present invention can also include a laser for generating a coherent laser beam, and means for combining the laser beam with the solar light energy and providing the combined light energy to the illuminator for transmission along the path.

In accordance with another aspect of the invention there is provided an image generating apparatus comprising means for directing a burst of direct sunlight along an optical path toward an object and means, directed along the optical path and responsive to incident radiation, for forming an image of said object in response to reflections of the burst of sunlight.

The image forming means used in the image generating apparatus can either be a camera or an electronic image forming means, such as the vidicon of a television camera.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
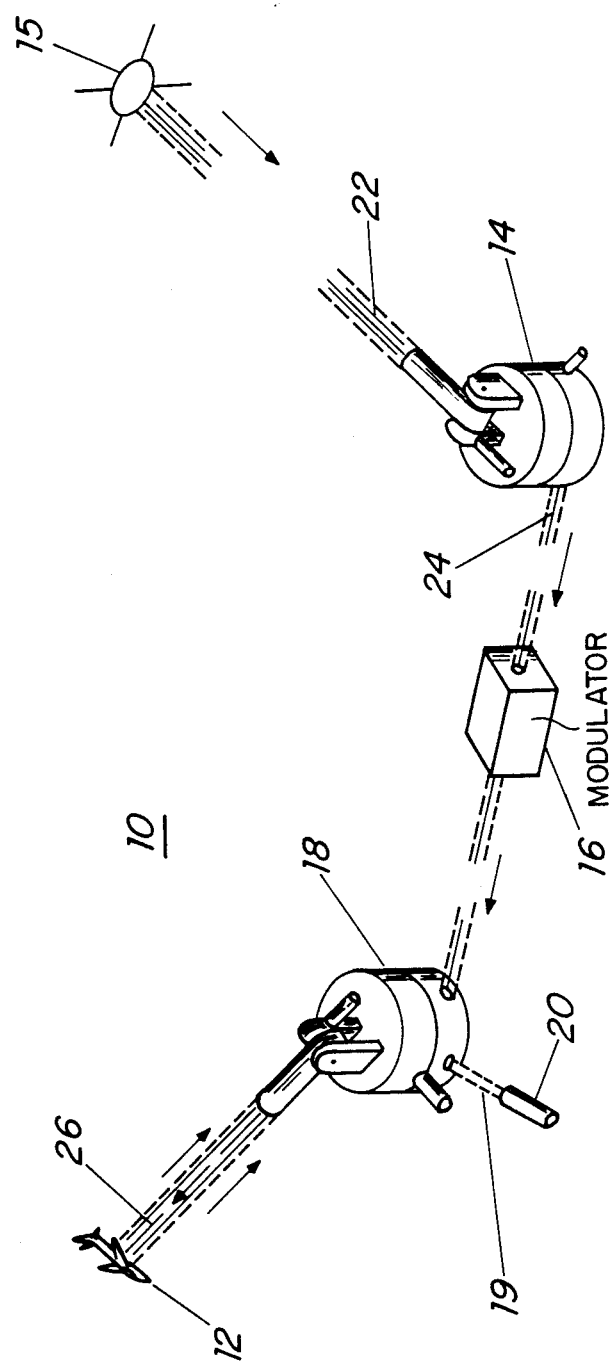
FIG. 1 is an illustration of an optical system in accordance with the present invention

FIG. 1 is an illustration of a system 10, using the present invention, for sensing the optical characteristics of a target having optical sensor equipment. In the system 10 illustrated in FIG. 1, it is desired to sense the optical characteristics of sensor equipment located on board a non-friendly vehicle, such as aircraft 12. If aircraft 12 is a reconnaissance-type aircraft with on-board optical sensor equipment, such as cameras, which are oriented to receive illumination from directions which include the system 10, it becomes possible to direct a concentrated beam of light in the direction of target aircraft 12 and the concentrated beam of light becomes focused upon the focal plane of the optical sensor equipment on aircraft 12. The light is reflected from the smooth surface of the film or other sensor, is reflected therefrom, and retransmitted as a retro-reflected concentrated beam of light 26 in the direction of origin of the incident light from system 10.

Figure 10:
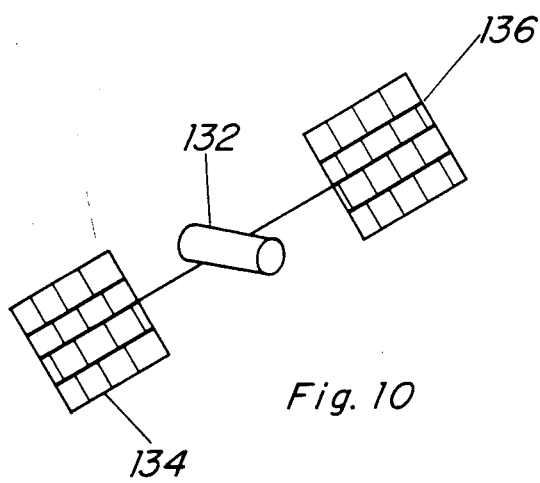
FIG. 10 illustrates a satellite incorporating the system of FIG. 1, wherein solar panels are used as a transmitting apparatus.

It has become customary in systems of the type illustrated in FIG. 10 to make use of laser equipment in order to generate a concentrated beam of transmitted light. Laser equipment has some desirable properties, including a coherent and tightly focused light beam, and a singular light frequency which can easily be detected. A disadvantage of using a laser as a light beam source is the fact that the use of a laser can be sensed by equipment aboard the target vehicle 12, and thereby the vehicle operator and owner can become aware that the vehicle is being probed by special radiation.

In the art of sensing equipment aboard a non-friendly vehicle, it is desirable to avoid alerting the owner or operator of the non-friendly vehicle of the fact that it is being probed by light transmitting and sensing equipment. The system 10, illustrated in FIG. 1, enables the use of natural sunlight as a light source for such probing equipment, whereby the fact that a vehicle is being probed can be disguised as a natural sunlight reflection "glint," which might otherwise be normally observed by the vehicle and which might result from natural phenomena.

The system 10 includes a solar tracker and light receiver 14, which is oriented to receive direct sunlight which is incident along a path 22 from sun 15. The incident sunlight, received by the solar tracking equipment 14, is directed along a fixed path 24 toward the transmitter/receiver unit 18. Arranged in light path 24, between the solar tracker equipment 14 and the transmitter/receiver 18, there is provided a modulator 16 for regulating the amplitude, pulse shape, pulse duration and other characteristics of the light which is to be transmitted by transmitter/receiver 18 along a light beam 26 in the direction of a selected target vehicle 12. Light which is retro-reflected along path 26 from vehicle 12 is received by transmitter/receiver 18 and output along a fixed path 19 into a receiver and detector 20. Receiver and detector 20 may then analyze the characteristics of the received light beam in order to determine the presence or absence of sensor equipment on vehicle 12, and in order to determine certain of the characteristics of that equipment, as will be further explained.

Figure 2:
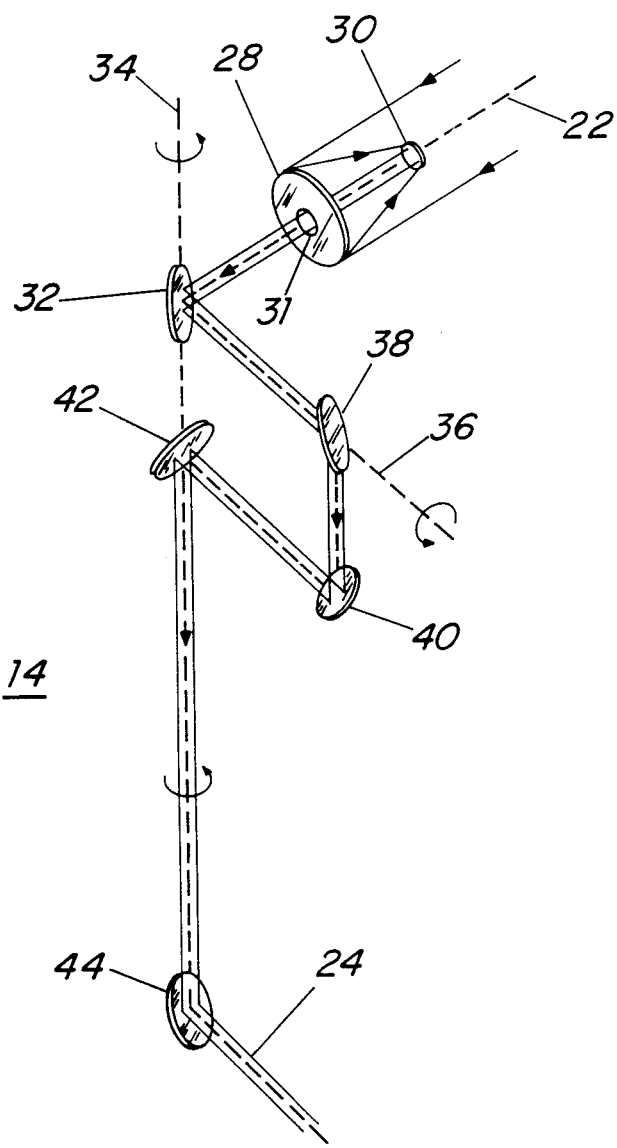
FIG. 2 is an illustration of the optical components of a solar energy collector used in the system of FIG. 1.

FIG. 2 is a light path diagram illustrating one embodiment of a solar tracker and receiver 14 usable in connection with the system 10 illustrated in FIG. 1. The tracker/receiver 14 illustrated in FIG. 2 includes a primary reflector/receiver 28, which is concave in shape, and serves to concentrate incident sunlight from beam path 22 onto a convex secondary reflector 30. The convex secondary reflector 30 directs the concentrated sunlight in a narrow beam through an opening 31 in reflector 28, and then to planar reflector 32 which is located on the vertical and horizontal rotation axes 34, 36 of the tracker 14. Mirrors 38, 40 and 42 are arranged to enable rotation of tracker 14, including mirrors 28, 30 and 32 about a horizontal axis 36 to enable pointing of the solar tracker in the elevation direction, Mirrors 38, 40 and 42 are fixed with respect to the movement of the tracker in the elevation coordinate. Mirrors 42 and 44 are arranged to enable rotation of solar tracker 14 in the azimuth coordinate around the vertical axis 34. In this respect, mirror 42 is rotatable about the azimuth axis while mirror 44 is fixed. The concentrated received light beam which is reflected off mirror 44 along path 24 is thereby fixed with respect to the installation of system 10. This light beam can be provided to modulator 16 wherein modulation takes place and thereafter provided to transmitter/receiver 18, which will be further described.

Modulator 16, illustrated as a block of equipment in FIG. 1, can comprise a conventional camera shutter, but may preferably include other more complex light equipment, such as movable mirrors or the like. In some embodiments it is desirable to provide a modulation which is pseudo-random in output signal amplitude, thereby to appear like random reflections of sunlight off a vibrating piece of Earthbound equipment, like a wind-blown mirror. Thus, the light transmission, which is radiated from system 10 toward vehicle 12, can appear as a natural occurrence rather than a deliberate beam of radiation intended to probe the optical characteristics of sensor equipment aboard vehicle 12.

Figure 3:
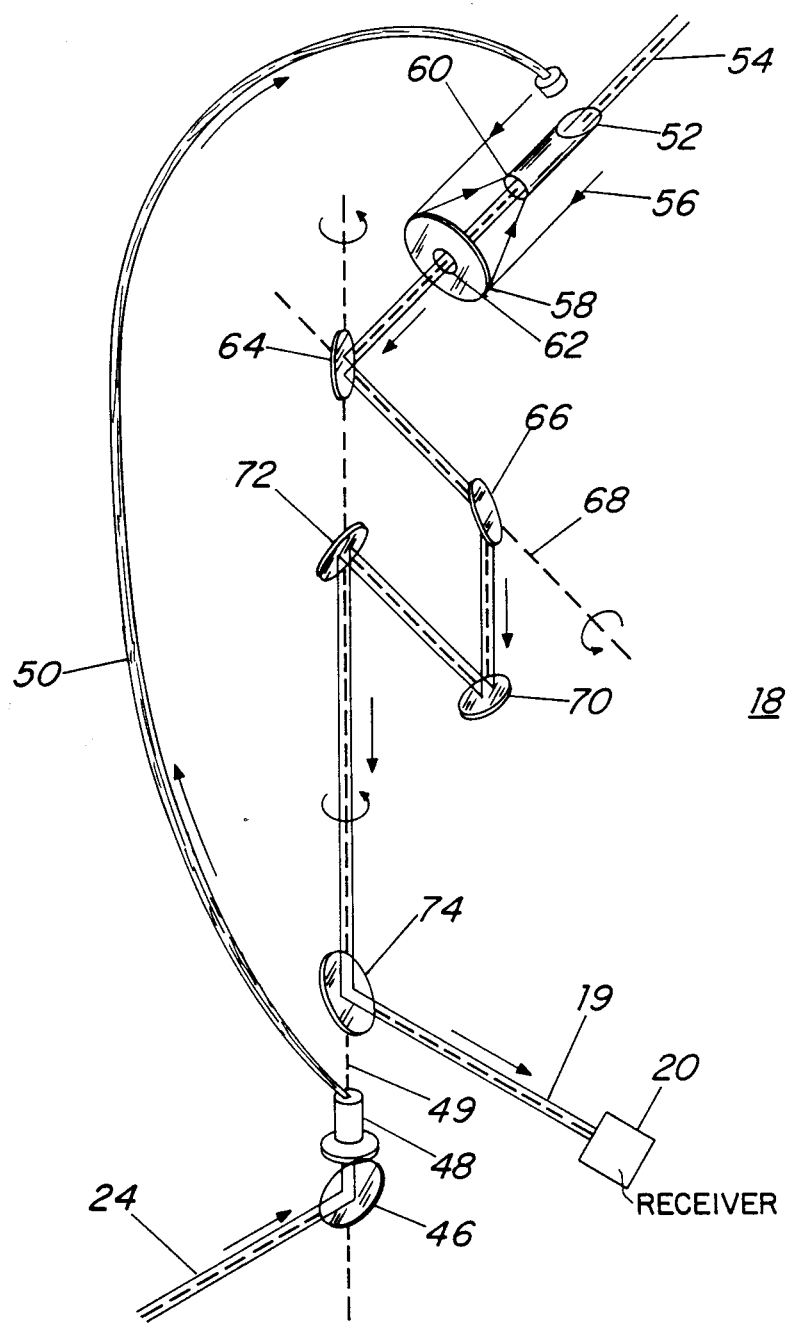
FIG. 3 is a diagram illustrating the optical components of the transmitter/receiver unit used in the system of FIG. 1.

FIG. 3 is a light path diagram of one embodiment of transmitter/receiver 18 used in the system 10 of FIG. 1. A concentrated beam of collected sunlight enters transmitter/receiver 18 along fixed beam path 24 from modulator 16. The incident light beam is first reflected by fixed mirror 46 so that it travels upward along the vertical axis 49 for azimuth rotation of transmitter/receiver 18. After being deflected along this rotational axis, the light beam enters a fiber optical light guide 50 through endpiece 48. Light guide 50 conducts the incident light onto a mirror 52, which is located in front of the secondary reflector of the receiving portion of the main parabolic reflective mirror, so that the incident sunlight beam 24 is transmitted outward in a beam 54 toward target 12.

The use of flexible light guide 50 for conducting light from fixed mirror 46 to deflecting mirror 52 facilitates the rotation of the transmission axis of transmitter/receiver 18 in the elevation direction.

Light, which is reflected from optical sensor equipment on target vehicle 12, returns along a light path 56 and is captured by the primary reflector concave mirror 58. Concave mirror 58 concentrates the captured light onto secondary convex reflector 60, which reflects the light in a concentrated beam through an aperture 62 in primary reflector 58. Mirrors 64, 66, 70 and 72 are provided to enable rotation of the primary reflector and mirror 64 around horizontally oriented elevation axis 68. Mirror 72 deflects the received light beam along vertical azimuth rotational axis 49 and onto fixed mirror 74 which deflects the light beam along fixed path 19 into receiver 20.

Figure 4:
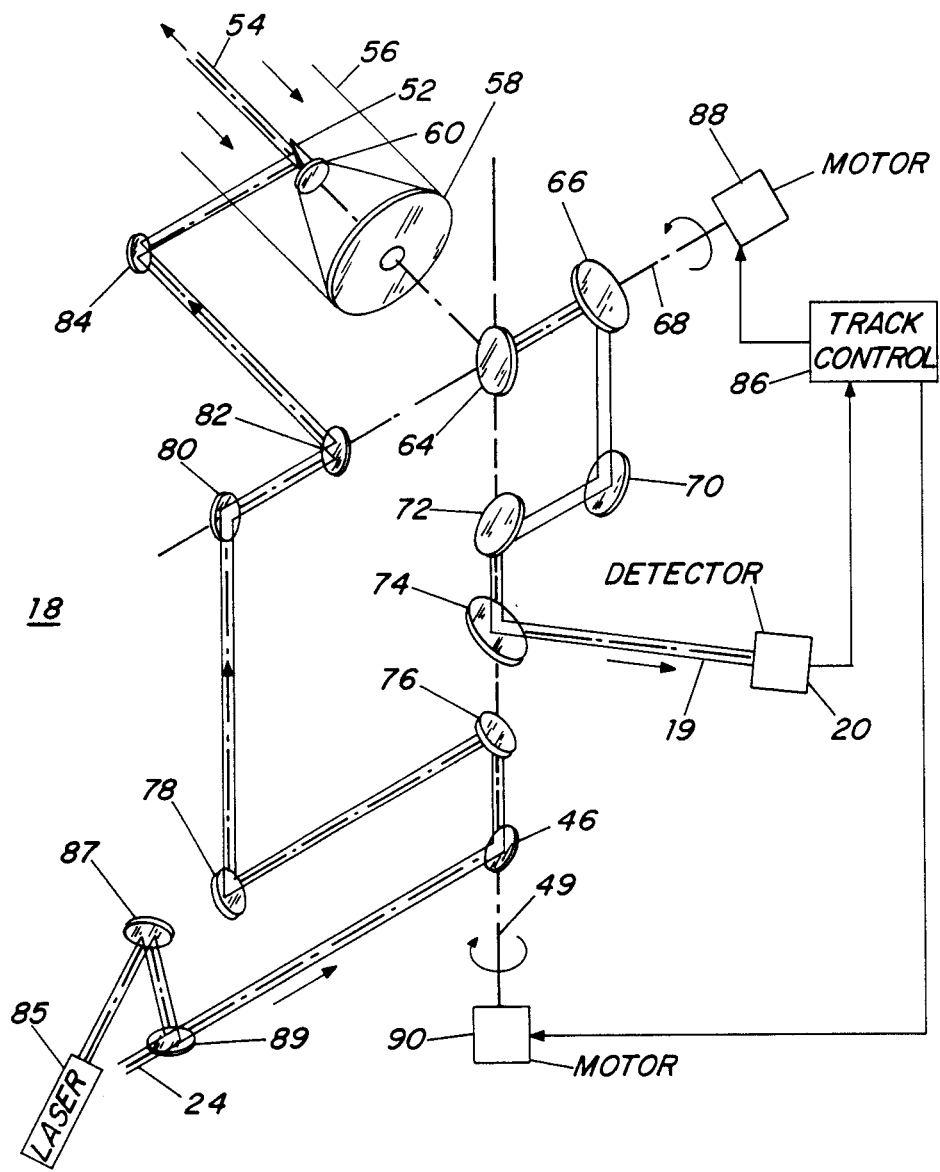
FIG. 4 is a diagram illustrating the optical components of an alternate embodiment of the transmitter/receiver unit used in the system of FIG. 1.

FIG. 4 illustrates the light path arrangement for a modified version of the transmitter/receiver 18 which is illustrated in FIG. 3. The FIG. 4 embodiment includes a first-mirror 46 arranged along the vertical azimuth rotation axis 49 for receiving and deflecting the incident optical beam in an upward direction along the axis. A rotating mirror 76 is provided for deflecting the incoming optical beam onto mirror systems 78 and 80, which deflect the beam again along one portion of the horizontal elevation rotation axis 68. Mirror 82, which rotates in the elevation direction as well as in the azimuth direction, deflects the outgoing light beam to mirror 84 and thence onto reflecting surface 52, which is mounted on secondary reflector 60, which deflects the light into transmitted optical path 54. The receiving optics of the transmitter/receiver illustrated in FIG. 4 are substantially the same as those illustrated in FIG. 3.

Shown schematically in FIG. 4 are motors 88 and 90 which are used to provide rotation of the transmitter/receiver 18 in azimuth and elevation planes. These motors are controlled by a track control unit 86, which may receive information on vehicle location from radar equipment, computer equipment in the case of an orbiting vehicle, or by reference to self-tracking equipment contained in track control unit 86 which is responsive to the received retro-reflected light beam which is detected in receiver 20.

One possible method of self-tracking is to provide azimuth and elevation position variations induced mechanically by motors 88 and 90 which will cause amplitude variations in the retro-reflected signals as the transmitter/receiver apparatus 18 is moved onto or off of the retro-reflection target. By analyzing the amplitude variations as a function of position of the transmitter/receiver pointing system, it can be determined whether the system is accurately pointing at the target vehicle's sensor equipment or whether corrections should be made to the pointing direction. Such self-tracking equipment is well known in the field of radar equipment and is applicable to this system. The solar tracker 14 of FIGS. 1 and 2 may use similar equipment. Other methods of tracking are known which do not require movement of the transmitter/receiver pointing direction, and are well known to those skilled in the art.

Also illustrated in the embodiment of the transmitter/receiver shown in FIG. 4, is a laser 85 which generates a laser beam which is reflected by mirror 87 and partially-silvered mirror 89 onto the fixed light path 24 along which the solar light which is collected by tracker 14 is directed. Thus, the output of laser 85 can be added into the light beam 24 which is to be transmitted by transmitter/receiver 18. The purpose of adding the output of laser 85 into the sun simulating radiation is to covertly make use of desired properties of the laser with respect to coherent transmissions without making the laser easily detectable. In the presence of a burst of sunlight, the laser light would be difficult to detect, except by receivers which are deliberately looking for a laser. The use of laser 85 in connection with the transmission may facilitate the detection of certain properties in receiver 20 when the retro-reflected signal is received from vehicle 12.

Figure 5:
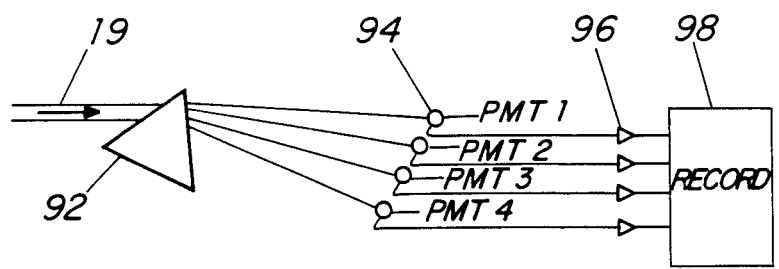
FIG. 5 is a schematic diagram illustrating a spectral analyzer receiver, usable with the sensing system of FIG. 1.

FIG. 5 schematically illustrates a possible configuration for a receiver which analyzes the spectral content of the received signal. The received light beam 19 is provided to a prism 92 which spreads the spectrum of the signal into a plurality of photomultiplier tubes 94. The outputs of the photomultiplier tubes are supplied by amplifiers 96 to a recording apparatus 98 which can record the various spectral contents of the received light and provide an analysis of the spectral content in order to determine the characteristics of the optical sensor equipment which is being probed by the system. For example, if the sensor equipment being probed is an infrared camera, the spectral characteristics of the reflected signal incident on path 19 would tend to show a greater transmission in the infrared region of the spectrum than in higher regions. Filters or gratings may also be used for such spectrum analysis.

Figure 6:
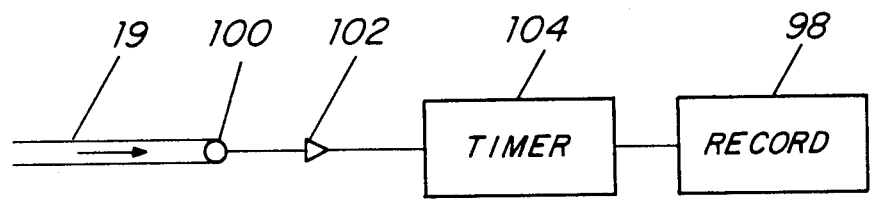
FIG. 6 is a schematic block diagram illustrating a modulation detection receiver usable in the sensing system of FIG. 1.

FIG. 6 illustrates another possible configuration for the receiver 20 wherein the incident light beam is provided to a photomultiplier tube 100 which detects the amplitude of the incident light beam. The amplitude characteristic comprises essentially a modulation envelope which is amplified by amplifier 102. If the sensor equipment being probed is, for example, a motion picture camera, or other high-speed camera, it is possible to determine the shutter frequency and exposure time by timing and counting the received modulation pulses. This information can be recorded in recorder 98 for later readout and analysis.

Figure 7:
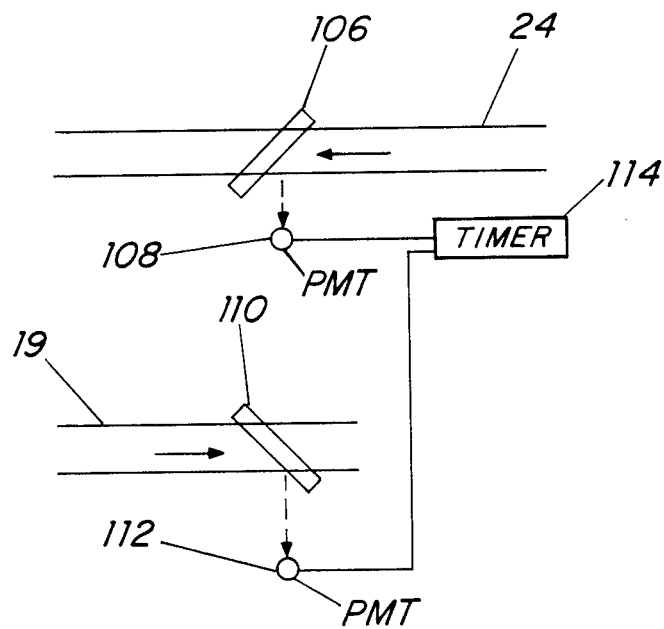
FIG. 7 is a schematic diagram illustrating a range-finding receiver usable in the sensing system of FIG. 1.

FIG. 7 illustrates equipment which is useful in connection with the transmitter and receiver of FIG. 1 for determining the range of the equipment being sensed. The light beam 24 which is derived from incident sunlight and modulated by modulator 16, is partially deflected by partially-silvered mirror 106 into photomultiplier tube 108 at a point following modulator 16. Thus, timer 114 is provided with an initiation pulse upon the transmission of a light beam from transmitter 18. When a retroreflected pulse is received along light path 26 and provided on light path 19 to receiver 20, a portion of the received signal can be deflected by partially-silvered mirror 110 into photomultiplier tube 112, which provides an output stop signal to timer 114. Accordingly, by timing the difference between the transmission pulse and the received pulse it is possible for the receiver to derive information concerning the range of the target 12.

Figure 8:
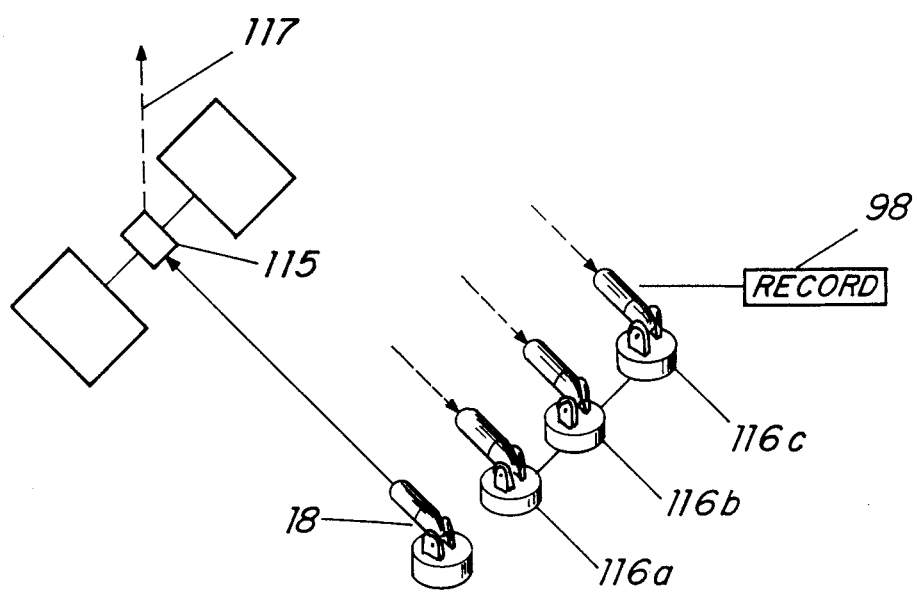
FIG. 8 illustrates a system for detecting optical resolution of an apparatus being sensed.

FIG. 8 illustrates a configuration which includes a solar light beam transmitter 18, which is essentially identical to the transmitter portions of the unit 18 illustrated in FIGS. 1 and 3, and multiple light beam receivers 116a, 116b, and 116c, each of which is oriented in substantially the same direction as transmitter 18 to receive retro-reflected light from an artificial satellite 115.

When a light beam is transmitted in the direction of an Earth-orbiting satellite, those skilled in the art will recognize that light which is retro-reflected from optical sensor equipment on board the satellite will not come down precisely along the same path as it went up, because of differences in the position of the ground with respect to the satellite which occurred during the transit time of the light beam. Accordingly, it may be necessary for detecting narrow beam equipment to locate one or more receivers for the retro-reflected optical signals in positions which are spaced from the position of the optical transmitter 18.

The embodiment illustrated in FIG. 8 is useful not only for providing a better collection of retro-reflected signals, but also providing an indication of the beamwidth of the retroreflected signal from the sensor equipment on satellite 115. The beamwidth of the retro-reflected signal is indicative of the resolution of the optics which are being probed. Since the light transmitted from an Earth station is focused by the optics of a sensor equipment on an Earth-orbiting satellite onto a single spot on the focal plane, the spot on the focal plane causes a retro-reflection of the signal into a light beam which has a beamwidth corresponding to the resolution of the optics. Thus, by measuring the amplitude characteristics of the retro-reflected signal over an area on the Earth to arrive at an indication of the retro-reflection beamwidth, it becomes possible to obtain information regarding the resolution characteristics of the satellite-borne optics.

Figure 9:
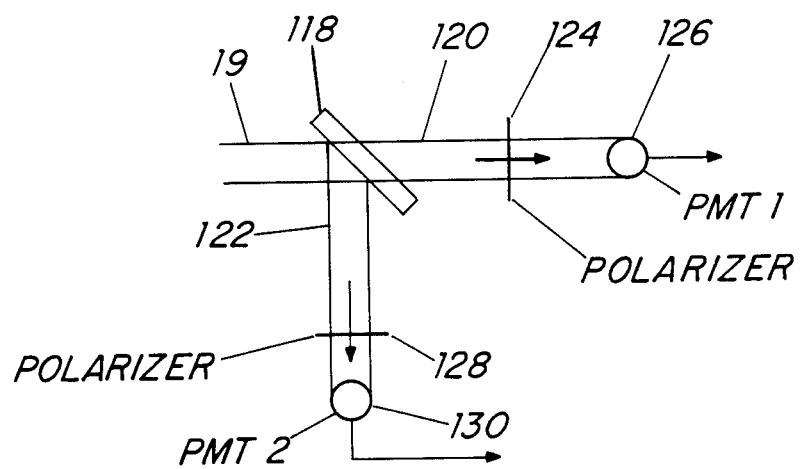
FIG. 9 is a schematic illustration of a polarization measuring receiver usable in connection with the sensing sytem of FIG. 1.

FIG. 9 illustrates equipment usable in the receiver 20 of the system 10 of FIG. 1, for determining the polarization characteristics of equipment in a target vehicle 12. When light is retro-reflected from the vehicle 12 and provided by the receiver along the optical path 19, it can be divided by partially silvered mirror 118 into a pair of light beams 120 and 122 each of which passes through a polarizer 124 and 128, respectively, to photomultiplier tubes 126 and 130 By rotating the polarizers and detecting the amplitude outputs of the photomultiplier tubes as a function of polarizer orientation, it is possible to get a reading of the polarization characteristics of the incoming light, which can give information regarding the polarization characteristics of sensory optics aboard a non-friendly vehicle.

Figure 10A:
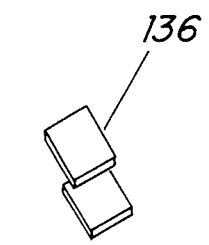

FIG. 10 illustrates a possible configuration for the light transmitting equipment according to the present invention which provides a covert and naturally disguised equipment configuration In FIG. 10 there is illustrated an artificial satellite 132 having silicon-type solar collector paddles 134. Each of the paddles 134 has a plurality of silicon cell "shingles" 136 which are illustrated in more detail in FIG. 10a. The solar collector paddles, and more particularly, the shingles 136 tend to have a high light reflectivity. As these paddles and the shingles are oriented to optimally collect light from the sun, it is possible that the reflected beam from these paddles will sweep past non-friendly vehicles and temporarily illuminate the vehicles. The orientation of shingles 136 on paddles 134 tend to each have an orientation angle with respect to the adjacent shingles. Thus, as the paddles are naturally steered in a manner which causes a beam of light to illuminate a non-friendly vehicle, there is a pulse-like light illumination of the non-friendly vehicle from the sequential reflection of sunlight off a plurality of the shingles 136. Reflections from the non-friendly vehicle which result from this illumination can be detected and analyzed. In order to obtain further information regarding the optical characteristics of sensory equipment on an unfriendly vehicle, it is possible to arrange for one or more of the shingles 136 to have reflection characteristics which will aid in the analysis; for example, reflection characteristics comprising only a narrow frequency band or reflection characteristics that supplement silicon cell data.

In accordance with the invention, it is possible to provide an apparatus which not only detects the characteristics of non-friendly vehicle-borne sensory equipment, but is possible to interrupt and temporarily or permanently inhibit the optical sensing operation of such sensor equipment. In particular, by transmitting a bright pulse of sunlight from a transmitter/receiver 18 of the type illustrated in FIG. 1, it becomes possible to provide sufficient illumination to sensor equipment aboard a non-friendly vehicle which will cause damage to the optical sensing plane, such as film or electronics. Alternatively, it is possible to only temporarily inhibit the optical system by providing a "glint" which temporarily obscures the film in the sensor equipment or temporarily obscures the electronic image sensing apparatus. It is also possible to appropriately modulate and direct solar illumination to jam infrared or optical sensors.

In order to further this type of permanent or temporary damage to film or electrical equipment, it is possible, as illustrated in the embodiment of FIG. 4, to provide additional laser light, which will be disguised by its mixing with sunlight, which will aid in destruction of sensing equipment.

Instead of providing deliberate damage to optical equipment, it is possible to activate automatic operation inhibiting devices which are sometimes included with such equipment. In order to protect optically sensitive components, some sensor equipment is provided with a sun shutter which closes the optical path in the event that strong solar illumination projects directly into the optical sensor equipment. By projecting solar illumination into the equipment, using the transmitter depicted in FIG. 1, it is possible to activate such a sun shutter and thereby temporarily inhibit the operation of sensor equipment for a selected period of time, in order to disguise operations which might otherwise be detected by the sensor equipment.

Figure 11:
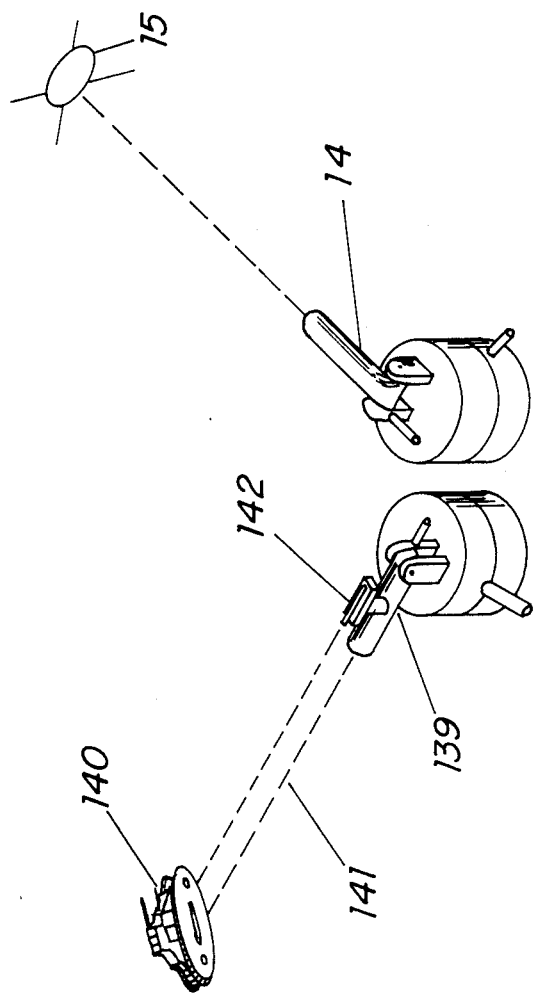
FIG. 11 illustrates a photographic system incorporating the present invention.

In accordance with a further embodiment of the invention, which is illustrated in FIG. 11, it is possible to make use of the sunlight transmitter of the present invention in order to achieve covert photography. In the system illustrated in FIG. 11, a light-gathering apparatus 14 provides sunlight to a transmitting apparatus 139 which sends the light along the path 141 as a flash of sunlight to illuminate a normally dark portion of an enemy vehicle 140. This burst of sunlight illumination can be used to provide sufficient light for the operation of camera 142, which thereby obtains a photographic picture of the normally darkened portion of vehicle 140 and gives an indication of the detailed structure thereof. The camera may be "gated on" in synchronization with the pulse in a manner described as "gated viewing" to reduce background noise.

The system of FIG. 11 can be used to obtain otherwise inaccessible photographs in situations where a non-friendly vehicle is within sight of friendly vehicles having photographic equipment, and when a portion of the non-friendly vehicle, which is either normally dark and thereby not illuminated from sunlight, or which is normally concealed by a door which is temporarily opened, can be photographed to obtain a determination of the nature and structure of the equipment within. The use of a flash of sunlight for photographing of such equipment is likely to be ignored and interpeted as a normal sunlight reflection, which may, for example, be caused by a moving window at the friendly installation. Again, the camera may be "gated" to maximize signal-to-noise characteristics of the receiver.

While there have been described what are believed to be the preferred embodiments of the present invention, those skilled in the art will recognize that other and further modifications may be made thereto without departing from the spirit of the invention, and it is intended to claim all such embodiment as fall within the true scope of the invention.

We claim:

1. A system for sensing optical characteristics of equipment located on a remote target, said equipment including at least one optical sensor oriented to receive optical illumination from directions which include said sensing system, comprising:
   target illumination means for directing a time controlled burst transmission of solar radiation from said sensing system in the direction of said target, to illuminate said target with solar radiation, said illumination means including a solar radiation collector, an optical modulator and an optical projector for emitting solar radiation modulated by said modulator in said target direction;
   retro-reflection receiving means for detecting solar radiation from said illumination means which is retro-reflected in a focused beam from the optical components of said optical sensor, said receiving means including means for collecting said retro-reflected light and providing said light on an optical path;
   and radiation measuring means, responsive to said light on said optical path, for measuring selected properties of said light representative of characteristics of the optical components of said optical sensor, thereby to determine said characteristics.

2. A system as specified in claim 1, wherein one of said optical components of said sensor comprises a shutter, wherein said detected solar radiation is modulated by said shutter, and wherein said measuring means includes modulation measuring means for determining characteristics of said shutter.

3. A system as specified in claim 1, wherein said measuring means include spectrum measuring means, for determining spectral characteristics of said sensor.

4. A system as specified in claim 1, further including target tracking means for pointing said illumination means and said receiving means at said target.

5. Apparatus for providing an image of an object at an object distance and angular object direction from said apparatus, comprising:
   means for collecting direct solar radiation and transmitting said collected solar radiation in a selected direction;
   first control means for controlling said selected direction to coincide with said angular object direction, for controlling said collecting and transmitting means to transmit a time-gated burst of solar radiation in said selected direction and for generating timing signals corresponding to the time of transmission of said burst;
   image forming means having a controllable shutter responsive to supplied control signals; and
   second control means, responsive to a supplied indication of said object distance, and responsive to said timing signals from said first control means, for providing said control signals to said shutter, to open said shutter at a time which is after said time of transmission of said burst by a time interval corresponding to the time of light transmission over twice said object distance.

6. A system for sensing range of a remote target, said target including at least one optical sensor oriented to receive optical illumination from directions which include said sensing system, comprising:

target illumination means for directing a pulse transmission of solar radiation from said sensing system in the direction of said target, to illuminate said target with solar radiation, said illumination means including a solar radiation collector, an optical pulse modulator and an optical projector for emitting solar radiation pulse modulated by said modulator in said target direction;

retro-reflection receiving means for detecting solar radiation from said illumination means which is retro-reflected in a focused beam from the optical components of said optical sensor, said receiving means including means for collecting said retro-reflected light and providing said light on an optical path;

and radiation measuring means, responsive to said light on said optical path, and responsive to said emitted pulse modulated solar radiation to measure the transit time of said radiation on said optical path, thereby to determine the range of said target.

7. A system for sensing optical resolution of equipment located on a remote target, said equipment including at least one optical sensor oriented to receive optical illumination from directions which include said sensing system, comprising:

target illumination means for directing a time controlled burst transmission of solar radiation from said sensing system in the direction of said target, to illuminate said target with solar radiation, said illumination means including a solar radiation collector, an optical modulator and an optical projector for emitting solar radiation modulated by said modulator in said target direction;

a plurality of spaced receivers for detecting solar radiation from said illumination means which is retro-reflected in a focused beam from the optical components of said optical sensor, said receiving means each including means for collecting said retro-reflected light and providing said light on an optical path;

and a plurality of radiation measuring means each coupled to the optical path of a respective one of said receivers, said measuring responsive to said retro-reflected light to measure the spacial amplitude thereof, thereby to determine the resolution of said optical components of said optical sensor.

8. A system for sensing optical polarization of equipment located on a remote target, said equipment including at least one optical sensor oriented to receive optical illumination from directions which include said sensing system, comprising:

target illumination means for directing a time controlled burst transmission of solar radiation from said sensing system in the direction of said target, to illuminate said target with solar radiation, said illumination means including a solar radiation collector, an optical modulator and an optical projector for emitting solar radiation modulated by said modulator in said target direction;

retro-reflection receiving means for detecting solar radiation from said illumination means which is retro-reflected in a focused beam from the optical components of said optical sensor, said receiving means including means for collecting said retro-reflected light and providing said light on an optical path;

and polarization measuring means, including at least one optical polarizer for measuring polarization characteristics of said retro-reflected light, thereby to determine polarization characteristics of said optical sensor.

* * * * *

UNITED STATES PATENT AND TRADEMARK OFFICE
CERTIFICATE OF CORRECTION

PATENT NO. : 4,836,672
DATED : June 6, 1989
INVENTOR(S) : Naiman et al.

It is certified that error appears in the above-identified patent and that said Letters Patent is hereby corrected as shown below:

First page, last line of Item 75, "Greenbaum" should read --Greenebaum--.
Col. 1, line 56, "Is is" should read --It is--.
Col. 2, line 1, "mean" should read --means--.
Col. 3, line 13, after "collectors" insert a period (.).
Col. 5, line 27, "direction," should read --direction.--.
Col. 8, line 47, before "In" insert a period.
Col. 10, line 2, "interpeted" should read --interpreted--.
Col. 12, line 12, after "measuring" insert --means--.

Signed and Sealed this

Thirteenth Day of March, 1990

*Attest:*

JEFFREY M. SAMUELS

*Attesting Officer*  *Acting Commissioner of Patents and Trademarks*